D. HESS.
TUBE-FASTENING FOR STEAM-BOILERS.
No. 187,382. Patented Feb. 13, 1877.
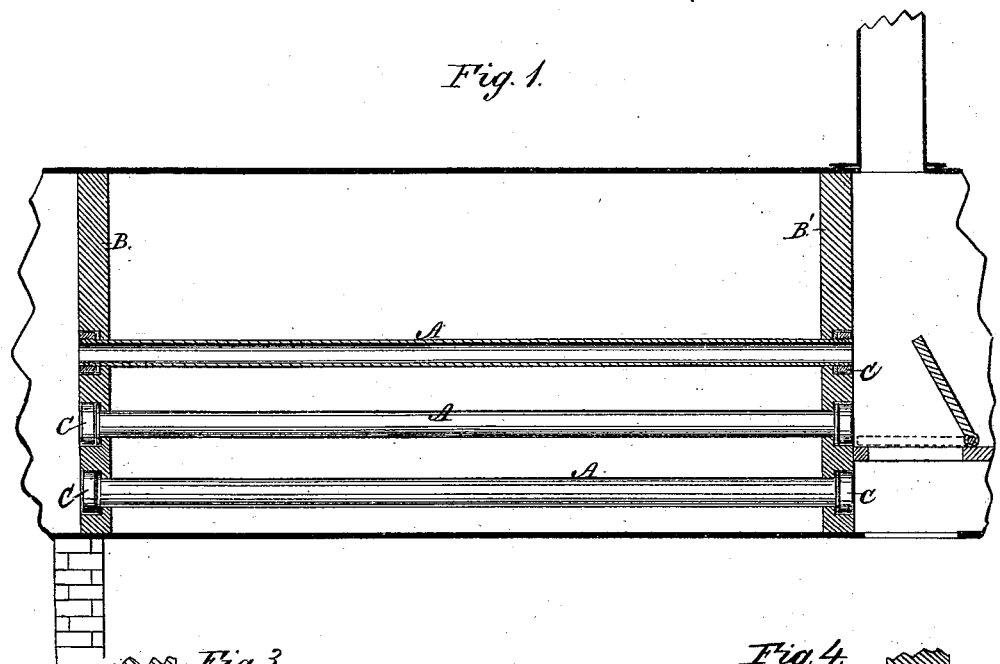
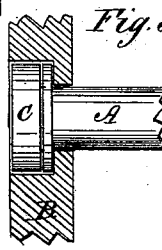
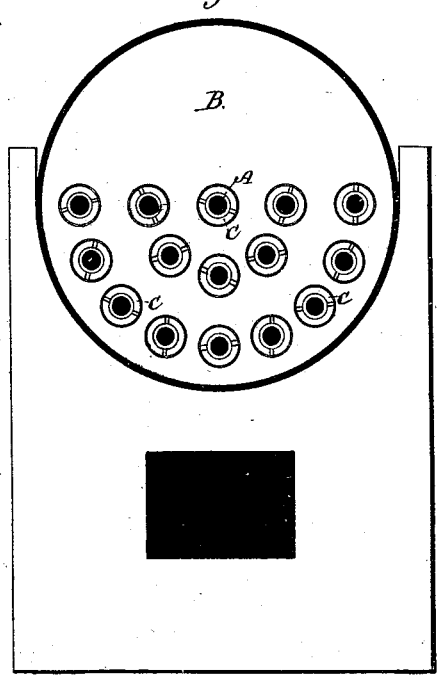
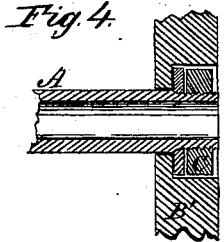
WITNESSES:
W. W. Hollingworth
Solon C. Kemon
INVENTOR:
Daniel Hess
BY
ATTORNEYS.

UNITED STATES PATENT OFFICE.

DANIEL HESS, OF GREENVILLE, MISSISSIPPI.

IMPROVEMENT IN TUBE-FASTENINGS FOR STEAM-BOILERS.

Specification forming part of Letters Patent No. 187,352, dated February 13, 1877; application filed January 30, 1877.

*To all whom it may concern:*

Be it known that I, DANIEL HESS, of Greenville, in the county of Washington and State of Mississippi, have invented a new and useful Improvement in Tube-Sheets and Fastenings for Tubes of Steam-Boilers; and I do hereby declare that the following is a full, clear, and exact description of the same:

Fire tubes are generally secured in the tube-sheets of boilers by upsetting and flaring their ends, thus forming a circular flange or lip thereon. An improvement upon this method is to countersink the apertures in the tube-sheets, through which the fire-tubes are inserted, and to apply circular nuts, which are screw-threaded exteriorly, to adapt them to be screwed into the recesses, and also constructed with a circular opening or socket to receive the ends of the tubes. The tubes are secured solely by the pressure of rubber packing placed behind the nuts, and the latter project from the face of the tube-sheets.

The object of my invention is to remedy the objections of these methods. For this purpose the ends of the tubes are screw-threaded exteriorly and the nuts provided with corresponding screw-threads internally, so that when the nuts are screwed home the tubes are firmly secured in place, and also become or act as so many rigid stays for the tube-sheets. The construction and function of the nuts enable them to be made thin, so that they will lie flush with the face or outer side of the tube-sheets.

In the accompanying drawing, forming part of this specification, the fire-tubes A and tube-sheets B B' of the boiler have the local relation usual in steam-boilers. The ends of the tubes are screw-threaded, and nuts C are screwed thereon, as shown. The holes or apertures in the tube-sheets, through which the tubes pass, are countersunk, as shown, to adapt them to receive the said nuts C when screwed home, for the purpose of fastening or securing the tubes. The form of countersink or cavity may be varied or changed, but that I have represented in the drawing has its sides at right angles to the floor or bottom thereof. The form of the nut will, of course, correspond to that of the cavity. The nuts are provided with nicks or recesses to enable a suitable wrench to be applied for screwing them on or off the tubes. A suitable packing is placed in each countersink around the respective tubes for the purpose of insuring a tight joint, and when the nuts are screwed up against the packing, they and the ends of the tubes are flush with the front or outer side of the tube-sheets, as shown. The nuts and screw-thread are thus partially protected from impingement of the frame. The nuts being screwed in opposite directions, the tubes are subjected to a tensile strain, and tend to draw the tube-sheets inward or toward each other, acting thus as tension-rods and imparting material rigidity and strength to the boiler.

What I claim is—

The combination of the annular nuts C, screw-threaded internally and having a smooth or plain surface exteriorly, the fire-tubes having their ends screw-threaded externally, and the tube-sheets B B' provided with apertures countersunk to a depth equal to or greater than the thickness of the nuts to adapt them to receive the latter, as and for the purpose specified.

DANIEL HESS.

Witnesses:
SOLON C. KEMON,
CHAS. A. PETTIT.